United States Patent [19]

Kawasaki

[11] Patent Number: 4,619,476
[45] Date of Patent: Oct. 28, 1986

[54] EXPANDABLE STORAGE SYSTEMS FOR SMALL VEHICLES

[75] Inventor: Katsuyoshi Kawasaki, Tokyo, Japan

[73] Assignee: Honda Giken Kogyo Kabushiki Kaisha, Tokyo, Japan

[21] Appl. No.: 815,183

[22] Filed: Dec. 23, 1985

Related U.S. Application Data

[63] Continuation of Ser. No. 459,482, Jan. 20, 1983, abandoned.

[30] Foreign Application Priority Data

Jan. 21, 1982 [JP] Japan .................................. 57-7278[U]
Jan. 21, 1982 [JP] Japan .................................. 57-7279[U]

[51] Int. Cl.⁴ ............................ B62J 7/06; B60R 5/02; B62D 25/12
[52] U.S. Cl. .................................. 296/37.1; 296/78.1; 296/76; 280/289 S
[58] Field of Search .................... 296/24 R, 37.1, 37.5, 296/37.16, 50, 55, 76, 78 R, 78.1, 106, 194; 180/210, 215, 219; 280/289 A, 289 S, 289 G; D12/85, 107, 184–186, 182; 160/210, 217, 233, 234; 16/286

[56] References Cited

U.S. PATENT DOCUMENTS

| | | | |
|---|---|---|---|
| 1,380,312 | 5/1921 | Bellican | 16/286 |
| 2,086,091 | 7/1937 | Payette | 296/76 |
| 3,063,747 | 11/1962 | Anderson | 296/55 |
| 3,216,760 | 11/1965 | Buchwald | 296/76 |
| 3,237,239 | 3/1966 | Rudnick | 160/233 |
| 3,827,105 | 8/1974 | Branchaud | 16/286 |
| 4,372,602 | 2/1983 | Tsuchiya et al. | 296/78 R |
| 4,413,854 | 11/1983 | Hirshberg | 296/76 |

FOREIGN PATENT DOCUMENTS

| | | | |
|---|---|---|---|
| 524557 | 3/1956 | Belgium . | |
| 938769 | 2/1956 | Fed. Rep. of Germany . | |
| 433550 | 1/1912 | France . | |
| 1080554 | 10/1954 | France . | |
| 1904 | 7/1911 | United Kingdom . | |
| 522078 | 6/1940 | United Kingdom . | |
| 581403 | 10/1946 | United Kingdom . | |
| 767983 | 2/1957 | United Kingdom . | |
| 1537233 | 12/1978 | United Kingdom | 296/78.1 |

Primary Examiner—Robert B. Reeves
Assistant Examiner—Dennis H. Pedder
Attorney, Agent, or Firm—Lyon & Lyon

[57] ABSTRACT

A storage system useful with vehicles having a front leg shield has a cavity with a defined size disposed within the front leg shield. A lid is pivotably connected to the front leg shield and is adapted to cover the cavity. In a first embodiment the lid is bifurcated into first and second sections, wherein the first section may be opened independently of the second section or the sections may be opened simultaneously. In a second embodiment the lid is swung into a half open condition and an erectable plate is swung into engagement with the lid to increase the cavity size.

5 Claims, 9 Drawing Figures

EXPANDABLE STORAGE SYSTEMS FOR SMALL VEHICLES

This application is a continuation, of application Ser. No. 459,482, filed 1-20-1983, now abandoned.

BACKGROUND OF THE INVENTION

This invention relates to storage systems and, in particular, those that are useful with motorcycles, motor tricycles and other small vehicles having a single steerable front wheel.

Heretofore, motorcycles had been provided with a front wheel and a rear wheel, and a motor disposed therebetween. Over the rear wheel, a platform has been arranged which was provided with a trunk or plurality of trunks to store items. These trunks are suspended on the platform with a plurality of rods, thus the trunks are only removable from the platform with a great deal of difficulty.

This applicant has previously provided a motor tricycle having one front wheel and two rear wheels with a motor disposed forward of the rear wheels. In this type of vehicle, it is also desirable that a certain amount of space be provided with the motor tricycle to store things. Because of the size of these vehicles, it is necessary that this storage space be provided in a limited and small space of the vehicle, and it is further desirable that the storage compartment be of a relatively large volume.

It has also been realized that in some instances the load is longer than the longitudinal dimension of the cavity formed within the leg shield. Therefore, it is impossible to close the lid, making it difficult to store the load that is to be carried. Therefore, it is desirable to design a storage system useful with vehicles to alleviate this problem.

SUMMARY OF THE INVENTION

This invention intends to improve previous storage systems used with motorcycles and motor tricycles and the object of the present invention is to provide a flexible storage system for small vehicles wherein a cavity opening to the front is provided within a leg shield disposed at the forwardmost part of the motor tricycle.

The cavity within the leg shield is provided with an openable lid to selectively cover the cavity, thereby providing secured room for storing things covered with the lid. Thus, the sleek front surface of the motor tricycle is maintained and the integrity of the leg shield and the lid is achieved wherein effective utilization of space is also realized.

In the present invention, the upper part of the lid is independently openable with the lower part of the lid kept closed; thus, with the upper part open, part of the load stored in the cavity may extend upwardly through the opening formed by the upper part of the lid. In this manner, a load that is longer than the longitudinal dimension of the cavity can be stored in the cavity with the lower lid closed, thereby enhancing the utilizability of the present storage system.

The full lid made up of an upper, and lower portions is pivotably attached at the lower portion of the front leg shield and thus is openable to make the entire cavity accessible to the driver. The upper part of the lid which is selectively openable is pivotably attached to the remainder of the lid; thus, the and lower portion of the lid may remain in its normal closed condition, when the upper portion of the lid is pivoted to expose the cavity for the purposes set forth herein.

In a second embodiment of the present invention, the volume of the cavity is increased by pivoting the entire lid about a pivot at the top of the lid in a clockwise direction. After the lid has been pivoted away from the leg shield, a biased erectable secondary plate, provided on the bottom of the cavity is erected until it engages with the lower end of the lid in the half open condition, thus the lid is shifted forward and is held in place by the secondary plate to increase the longitudinal dimension of the cavity storage space. Furthermore, the secondary plate is placed in a position to cover the lower part of the cavity when the lid is in the half open condition, thereby increasing the effective utilization of the storage system.

Accordingly, it is an object of the present invention to provide an improved storage system to be used with motorcycles, motor tricycles and other small vehicles having a single steerable front wheel. Other and further objects and advantages of the present invention will appear hereinafter.

BRIEF DESCRIPTION OF THE DRAWINGS

The following drawings will illustrate two embodiments of the present invention.

DETAILED DESCRIPTION OF THE PREFERRED EMBODIMENT

Turning in detail to the drawings, FIGS. 1-5 illustrate a first embodiment of the present invention.

Figure 1:
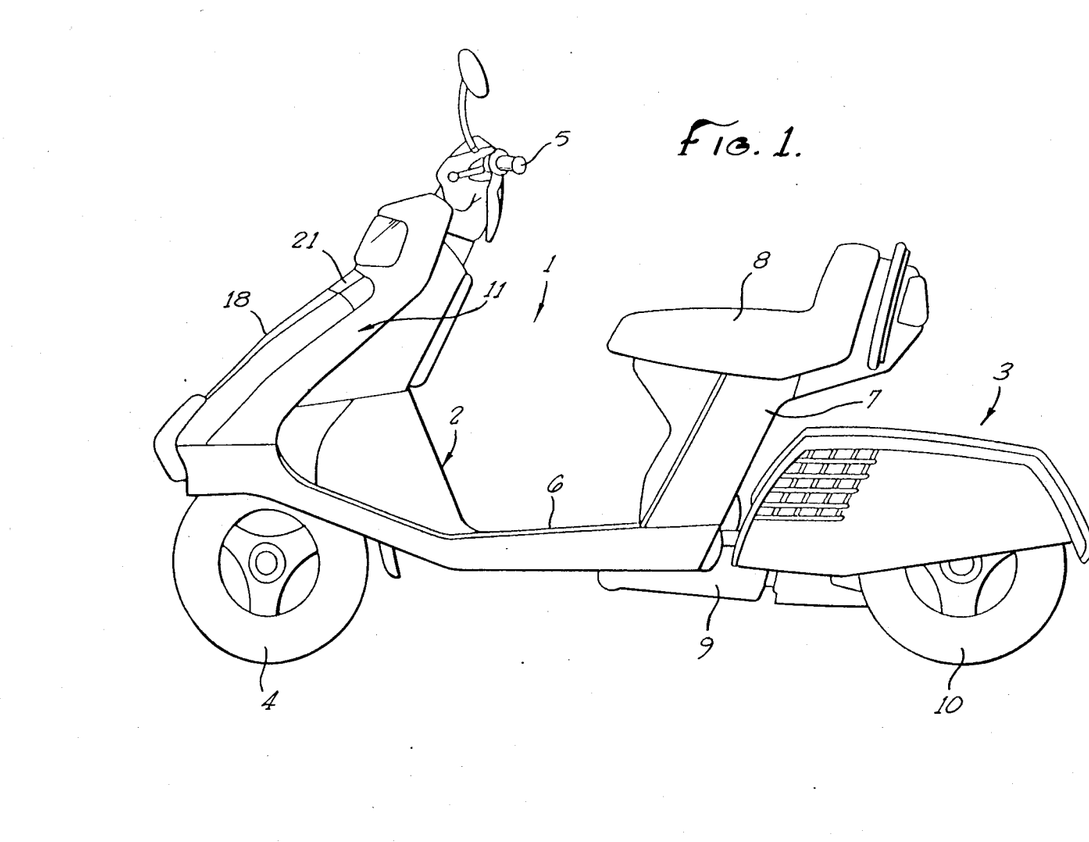
FIG. 1 is a side view showing a motor tricycle.
Figure 2:
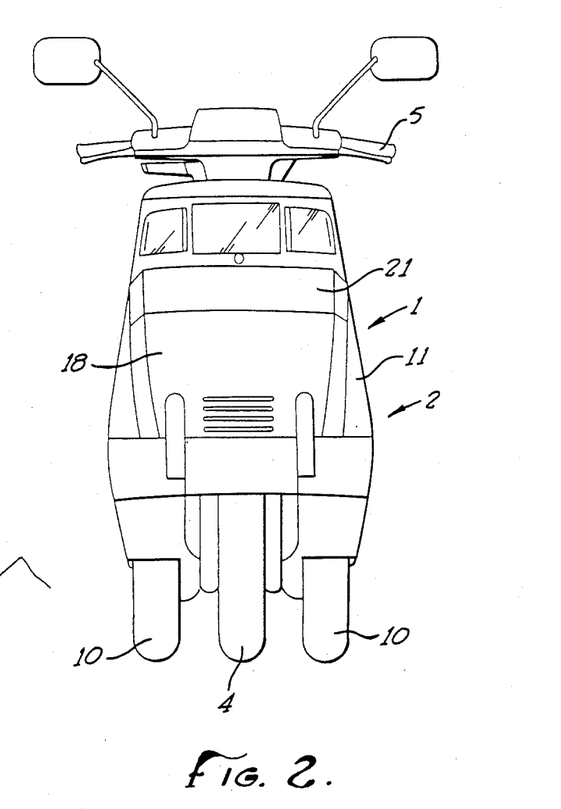
FIG. 2 is a front view showing the same motor tricycle.

FIG. 1 is a side view showing a motor tricycle containing the present invention and FIG. 2 is a front view showing the same motor tricycle. In the first preferred embodiment shown in FIGS. 1 and 2, a tricycle 1 is employed; however, the invention of the present application is also adaptable to motorcycles and other motor driven vehicles having a single steerable front wheel.

In FIG. 1, a tricycle 1 is provided with a front body 2 and a rear body 3. The front body 2 is provided at the forwardmost part of the tricycle 1 and has one front wheel 4 constituting a steerable wheel and pivotable about an axis perpendicular to its axis of rotation in response to pivoting of a handlebar assembly 5. At the intermediate portion of the tricycle 1, a floor of the low-floor type profile is provided. A seatpost 7 is disposed at an angle with respect to the floor 6 and has a seat 8 affixed at its top. The seatpost 7 is provided at the rearmost portion of the floor 6 and is preferably disposed at an obtuse angle with respect thereto.

A joint 9 is vertically swingable and is connected to the lower rear of the front body 2, wherein the joint 9 connects the front body 2 laterally and rotatably to the rear body 3. In the tricycle 1 of this first embodiment, the rear body 3 is provided with two rear wheels 10 constituting the driving wheels. A motor assembly (not shown) is provided forward of the rear driving wheels 10.

At the forwardmost portion of the foregoing front body 2 of the tricycle 1, a leg shield 11 is provided. Leg shields 11 are principally used to provide wind protection for the driver and also to deflect foreign material which may strike the tricycle 1 or the driver as the tricycle 1 moves.

The leg shield 11 is slightly wider than the body width of a driver and covers a distance from the bottom of the handlebar assembly 5 to the upper part of the front wheel 4. The lower part of the leg shield 11 is integral with a front fender 12 in the embodiment shown, and the floor 6 is formed from the bottom of the fender 12 and extends rearwardly therefrom.

A storage space 13 for headlight and blinker lamps, opening at the front, is formed in the upper part of the leg shield 11. A left and a right wall 14, 14 of the leg shield 11 are formed vertically and extend from a medial portion of the leg shield 11 to the left and the right of the storage space 13. These walls 14, 14 extend rearwardly from the storage space 13 to the bottom portion of the leg shield 11 and are designed to abut the front fender 12, as is better shown in FIG. 4.

Figure 3:
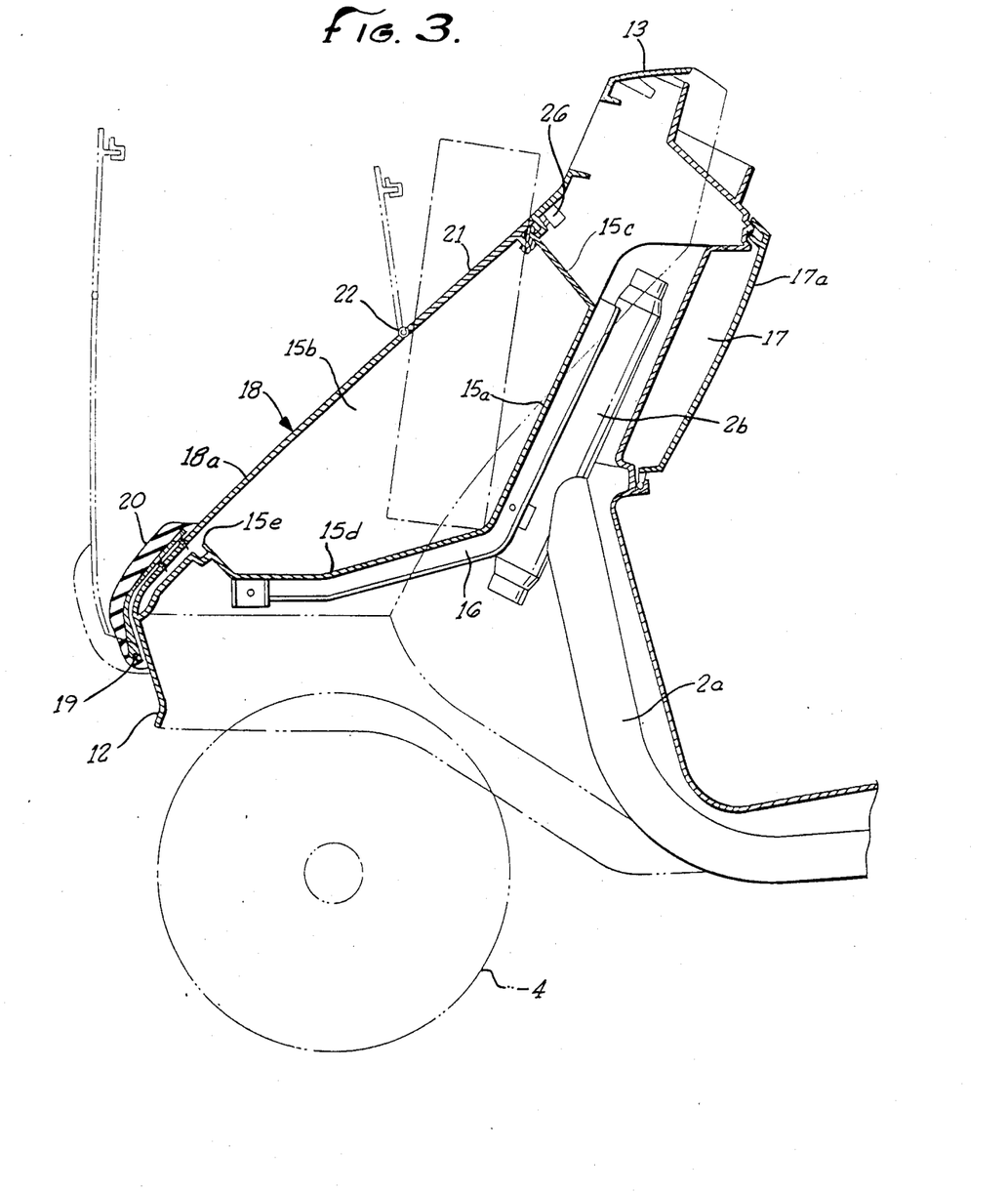
FIG. 3 is a side cutaway view showing the longitudinal section of the present storage system.
Figure 4:
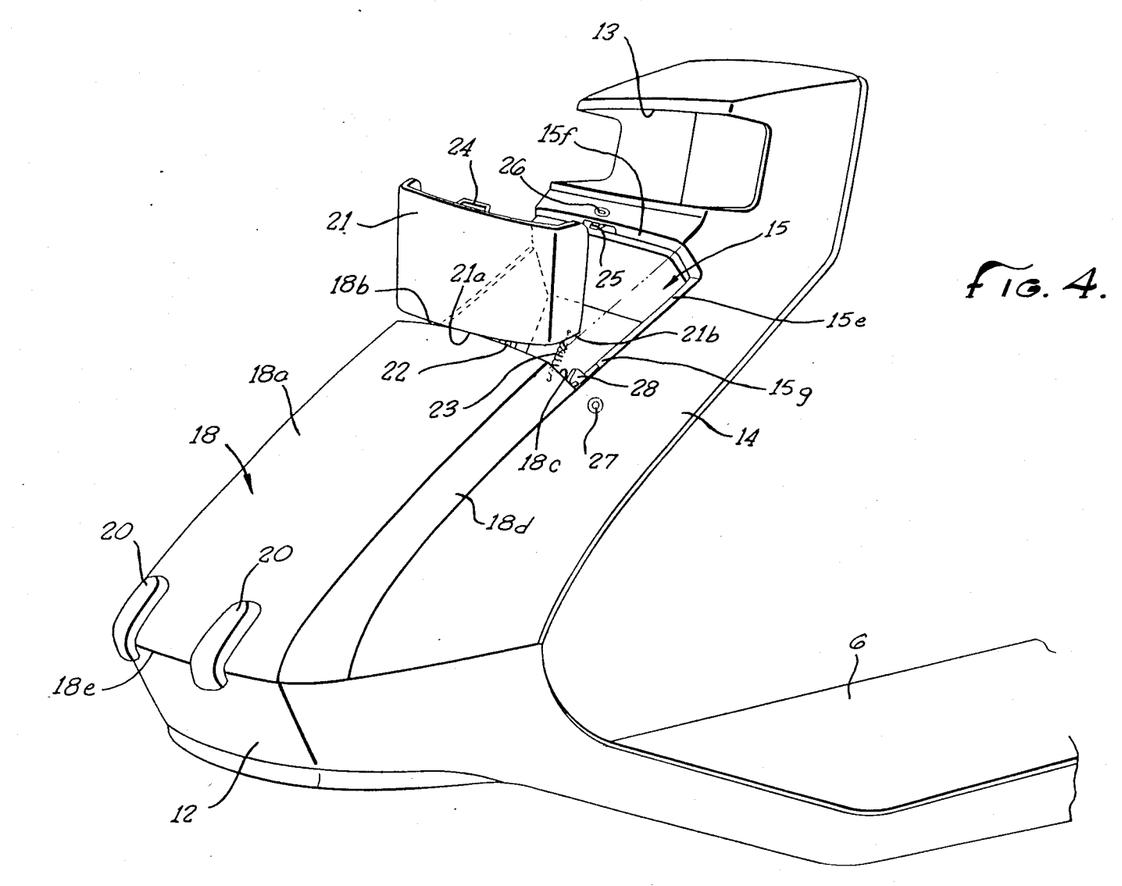
FIG. 4 is an oblique view showing the present storage system with the upper portion of the lid opened.

In accordance with the present invention, an area in the leg shield 11, which is surrounded by the bottom of the storage space 13 and the left and right walls 14, 14 and on its bottom end with the front fender 12 is depressed inwardly to form a compartment cavity 15, as illustrated in FIGS. 3 and 4. The middle portion of the inner base wall 15a of the cavity 15 is located in front of a head tube 2b, as shown in FIG. 3, provided at the front end of the frame 2a which extends below the floor 6.

The base wall 15a is installed upon and supported by the head tube 2b with a bracket 16 placed at a suitable location and rigidly affixed to the head tube 2b. The leg shield 11 is provided to cover the head tube 2b located to the rear thereof, and both sides 15b, 15b of the base wall 15 extend past the sides of the head tube 2b, wherein a cavity 17 to be closed with a cover 17a is provided at the back of the head tube 2b.

In the first preferred embodiment of the present invention, as illustrated in FIG. 3, the cavity 15 opens toward the front and is placed in the intermediate portion of the leg shield 11. A base wall 15a is connected to a left and right side walls 15b, 15b and an upper wall 15c and a bottom wall 15d. The walls 15a, 15d are connected to the bracket 16 which is attached to the head tube 2b to maintain the cavity 15 within the leg shield 11.

A trunk lid 18 is provided to cover the cavity 15 along the front opening edge 15e. The lid 18, angled upward from ahead of the front wheel, is pivotably and operably connected to the front of the front fender 12 at two places at the lower end with hinges 19, thus facilitating opening of the lid 18 in a generally counterclockwise manner. The hinges 19 constituting the pivotal attachment of the lid 18 are covered with rubber to form a front bumper 20 as shown in FIG. 3.

The trunk lid 18 is formed so that it constitutes the front exterior surface of the leg shield 11 and is continuous with an exterior surface thereof and the side walls 14, 14 for aesthetic and functional purposes. The lid 18 extends generally in the closed condition from the wall 15c to the hinges 19. An upper part 21 of the trunk lid 18 is formed so that it constitutes an extension of the lower part or lid body 18a, as shown in FIG. 4. The upper part 21 of the trunk lid 18 has the same section as the body 18a and is formed as a separate unit from the lid 18.

Figure 5:
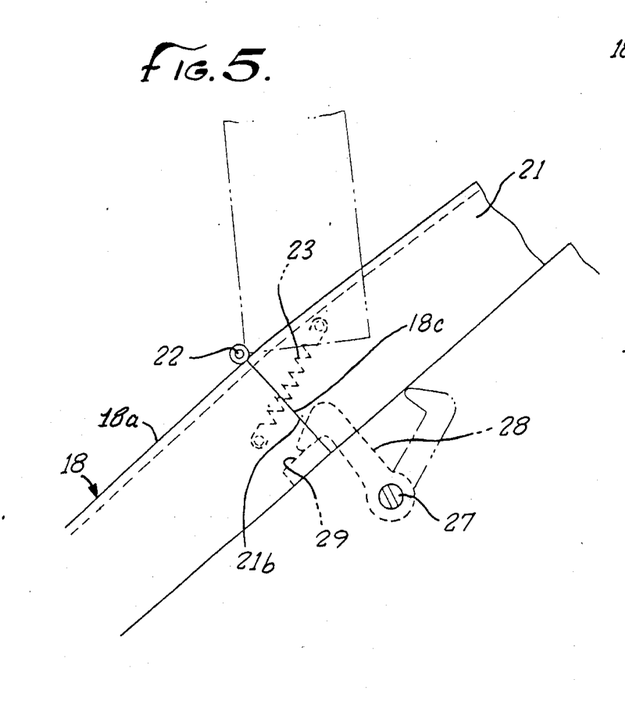
FIG. 5 is a side view showing the upper portion of the lid opened.
Figure 6:
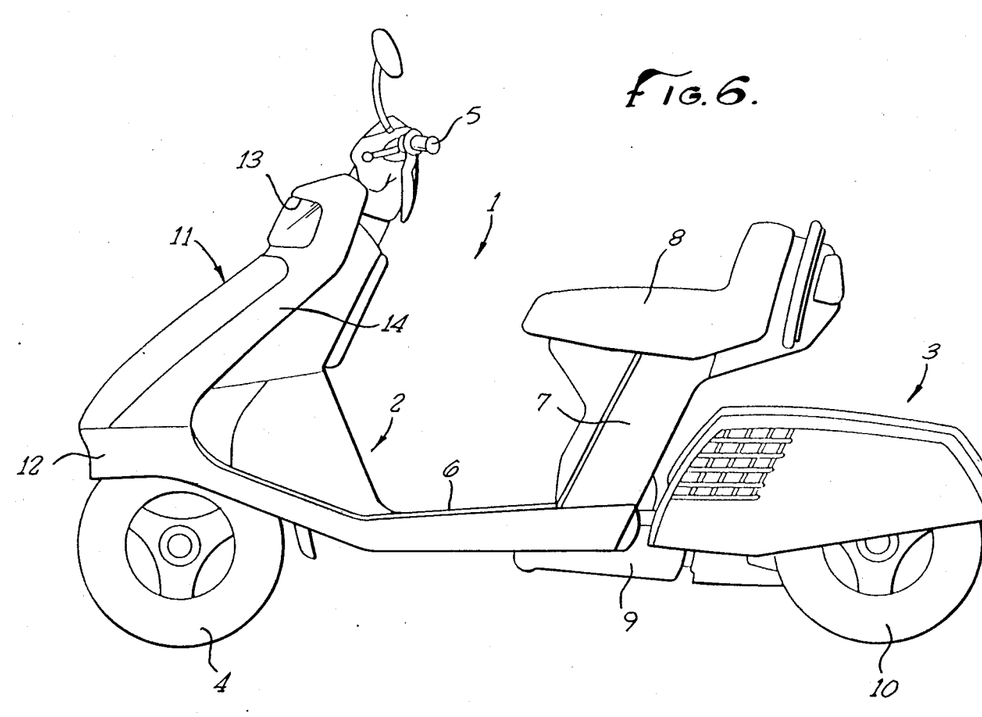
FIG. 6 is a side view showing a motor tricycle in accordance with the second embodiment.
Figure 7:
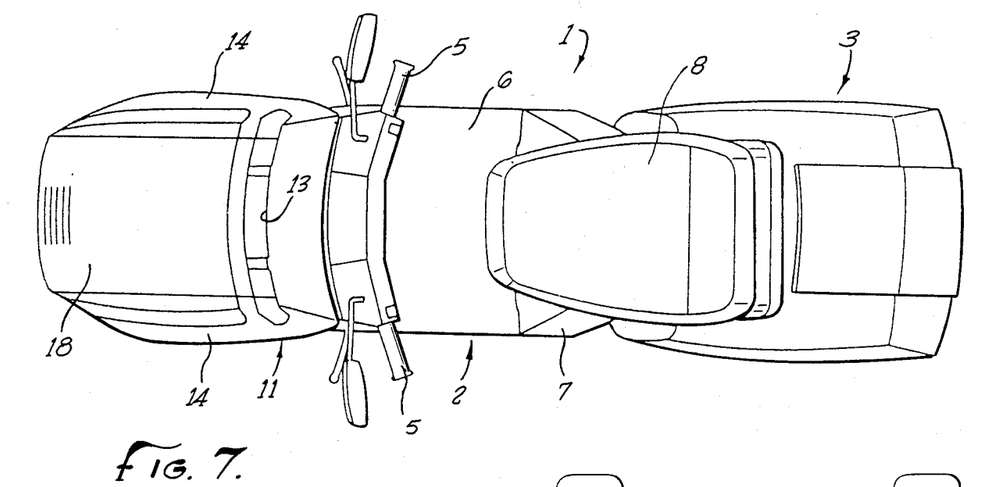
FIG. 7 is a top view showing the same motor tricycle in accordance with the second embodiment.

The upper end 18b of the body 18a is operably connected to the lower end 21a of the upper part 21 with a hinge 22, as shown in FIGS. 4 and 5. The upper part 21 is biased in the closing direction with respect to the lid body 18a by a spring 23 which is installed over the inner end surface of the upper part 21 and to the inner surface of the side end 18c. The two side ends 18c of the upper end 18b are in contact with the two side ends 21b of the lower end 21a, thus the body 18a and the upper part 21 normally compose a continuous surface forming a single lid in appearance.

An engaging piece 24 is provided at the upper end of the upper part 21, the engaging piece 24 being engagable with a second engaging piece 25 provided at the upper end 15f of the opening edge 15e. Thus, the opening edge 15e is apparently closed with a single lid, consituting the body 18a and the upper part 21. The engaging piece 25 is operated by a key cylinder 26 which is present below the storage 13.

Referring to FIGS. 4 and 5, in this first embodiment, a hook 28 is operated by a key cylinder 27 which is provided at the upper part of the opening edge 15e and along the side wall 14. An engaging piece 29 is provided on the inside portion of the side wall 18d of the lid body 18a and is located at the side end 18c, wherein the body 18a is locked and may be maintained in the closed condition with the upper part 21 in the opened condition. The use of the hook 28 and engaging piece 29 is illustrated in FIG. 5.

To operate the lid 18 of the present invention, in the initial condition the body 18a and the upper part 21 are integral with each other. The lid 18 normally closes or opens from the opening edge 18e for unloading and loading of articles to be placed within the cavity 15. When the load is longer than the longitudinal dimension of the cavity 15, the body 18a is locked with the hook 28 as shown in FIG. 4. This is accomplished by turning the key cylinder 27 until the hook 28 engages the engaging piece 29 as shown in FIGS. 4 and 5. After the hook 28 has engaged the engaging piece 29, the upper part 21 may be completely opened.

In this manner the upper part of the cavity 15 is opened allowing the upper part of the load to project upwardly through the opening in the lid 18. The presence of the energizing spring 23 causes the upper part 21 to press against the upper part of the load for holding the load in place within the cavity 15.

It is apparent from the foregoing that the present invention illustrates a storage cavity having an operable lid which can be provided at the front of a leg shield. In this manner effective utilization of space can be achieved and the appearance of the leg shield may be maintained by virtue of the integral surface comprised of the lid and the leg shield.

In this particular embodiment the openable part 21 of the lid 18 enables storage of a load which would otherwise be difficult in the cavity 15 space allotted within the leg shield 11. Thus, the effective utilization of the storage cavity 15 can be increased for the advantages set forth hereinabove. In addition, the upper part 21 is operative to maintain the load within the cavity 15, because it is biased to press against the load.

A second preferred embodiment of the present invention is illustrated in FIGS. 6–9. The same parts in FIGS. 6–9 as described in the first embodiment, represented by FIGS. 1–5, are identified by the same reference numerals, thus a detailed description is omitted herein.

Figure 8:
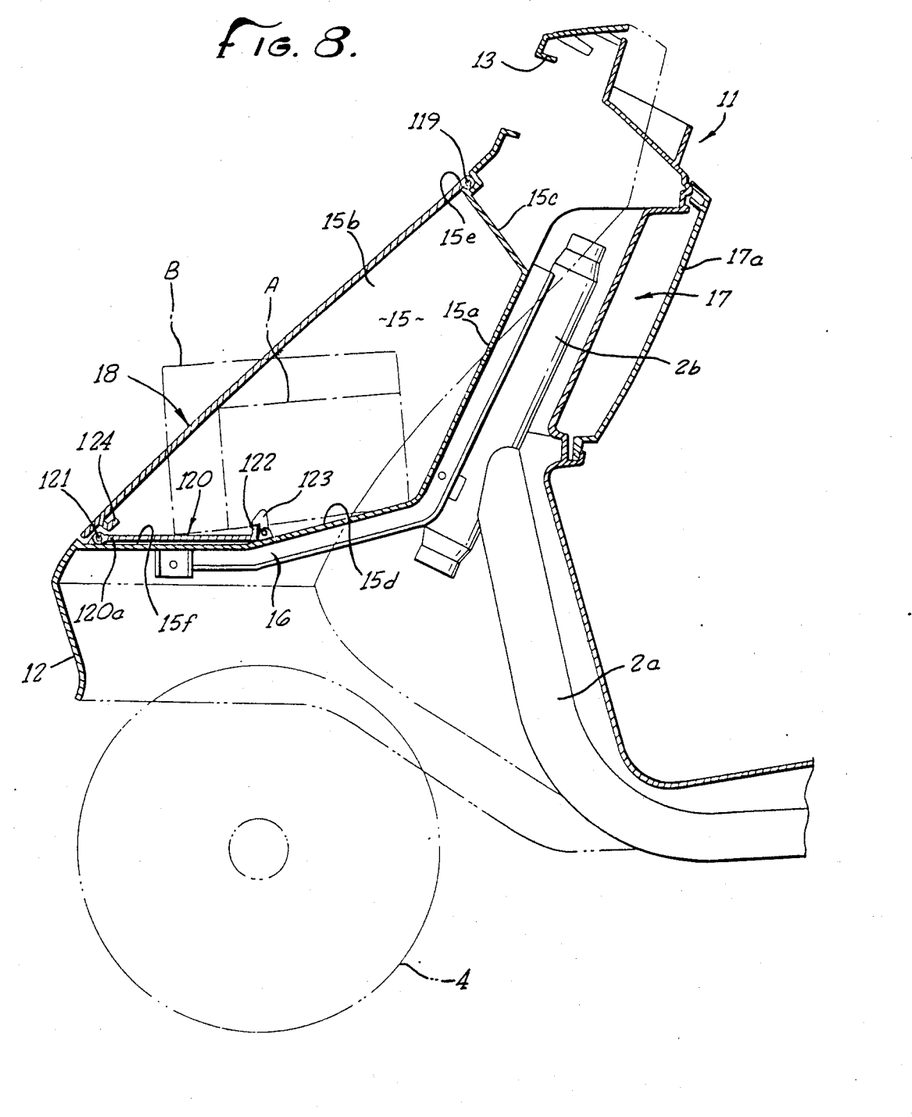
FIG. 8 is a side cutaway view showing the longitudinal section of the second embodiment of the present storage system.

In FIG. 8, the cavity 15 opens vertically long to the front in the intermediate portion of the leg shield 11. A base wall 15a is connected to a left and a right side wall 15b which are connected to an upper wall 15c and to a bottom wall 15d. This constitutes the cavity 15. The wall 15a and wall 15d are connected to the bracket 16 which is connected to the head tube 2b to maintain the cavity within the leg shield 11.

A trunk lid 18 is provided to cover the opening edge 15e of the cavity 15. The lid 18 is connected at the upper end of the opening edge 15e with a hinge 119. The hinge 119 is provided within the upper portion of the leg shield 11. In this manner the lid 18 is openable forwardly with the hinge 119 acting as the fulcrum. Thus, in the closed condition the lid 18 constitutes a front surface of the leg shield 11.

A front half 15f of the bottom wall 15d is made flat thus, a secondary plate 120 is capable of being placed on the front half 15f. The lower base end 120a of the secondary plate 120 is pivotably connected to the front end of the front half 15f with a hinge 121. A biasing means such as a spring (not shown) is provided at the hinge 121 to bias the secondary plate 120 into the erecting configuration.

An L-shaped hook 122 is provided at the top of the secondary plate 120; thus, when the secondary plate 120 is laid flat and placed upon the front half 15f, the hook 122 engages a swingable hook 123 provided at the intermediate portion between the bottom wall 15d and the front half 15f. The swingable hook 123 is adapted to engage the hook 122 to restrict movement of the secondary plate 120 into the erected position to form the bottom of the expanded cavity.

Figure 9:
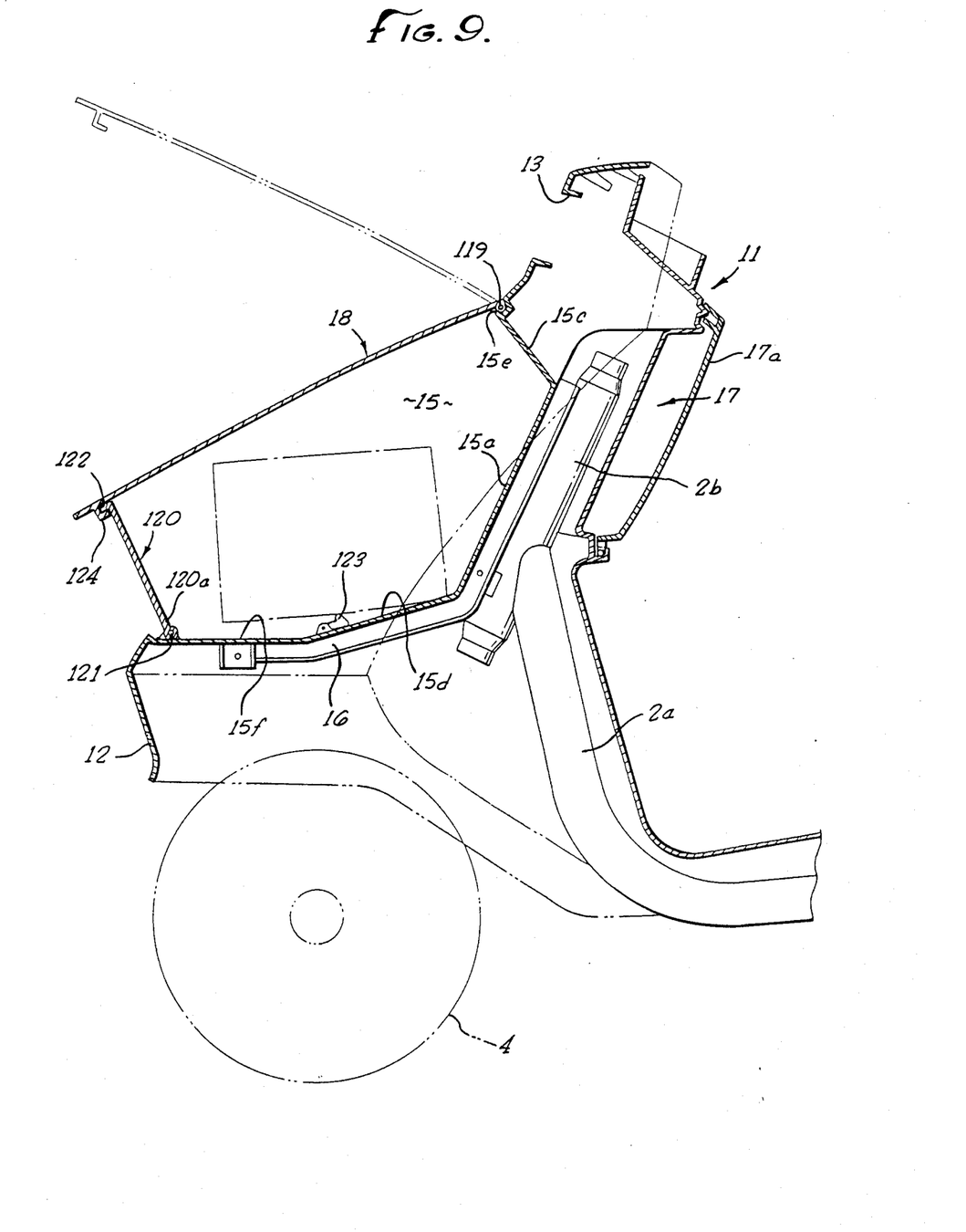
FIG. 9 is a side cutaway view showing the longitudinal section of the second embodiment of the present storage system when in the expanded condition.

A hook 124 is also operative to engage the hook 122, as shown in FIG. 9, provided on the lower side of the lid 18 to maintain the secondary plate 120 attached to the lid 18 when the secondary plate 120 has been erected. Thus, in the erected condition the secondary plate 120 provides all of the width of the expanded cavity 15.

The operation of the storage system of the second preferred embodiment is illustrated in FIGS. 8 and 9. FIG. 8 illustrates the cavity 15 with the lid 18 closed, wherein the load "A" which is within the longitudinal dimensions between the back of the lid 18 and the front of the base wall 15a can be stored. However, in the case of a load "B" which is longitudinally longer than this, the hook 123 is disengaged from the hook 122, wherein the secondary plate 120 may be erected about the hinge 121. Since the base plate 120 is biased to the upward position disattachment of the hook 123 from the hook 122 will automatically cause the base plate 120 to swing to the erected position.

The lid 18 is swung in a clockwise direction to a half open condition with the entire lid 18 pivoting about the fulcrum 119 to the condition shown in FIG. 9. In this condition, the hook 122 at the top of the secondary plate 120 is engaged with a hook 124 at the under side lower edge of the lid 18 to maintain this half open condition.

The lid 18 is held in this half open condition by virtue of the biased secondary plate 120 which is biased to the erected position. Thus, the distance between the back of the lid 18 and the base wall 15a is increased by as much as half, enabling storage of the load "B" which is larger than the longitudinal dimension between the lid 18 and the base wall 15a.

When used to store loads "B" the front of the cavity 15 is closed with the secondary plate 120. Because of the presence of the hook 122 and the hook 124, the secondary plate 120 and the lid 18 are locked thus insuring that the load "B" is maintained within the cavity 15.

Thus, it is apparent that the second embodiment of the present invention shows a storage cavity 15 formed within a front leg shield 11 of a small vehicle wherein the dimensions of the storage cavity may be changed according to the size of the load, thus allowing a load of a size otherwise too large for the cavity to be effectively carried by the small vehicle. This is accomplished by an erectable secondary plate 120 which normally constitutes a bottom of the cavity 15 and which is biased to the upward position to engage a lid 18 when placed in the half open condition. Therefore, the operation of this storage system is easy and the construction is simple requiring nothing more than the installation of a hook 124 on the lid 18 and the selective connection to a pivotal secondary plate 120.

While embodiments and applications of this invention have been shown and described in great detail, it should be apparent to those skilled in the art that many more modifications are possible without departing from the inventive concepts herein. The invention therefore is not to be restricted except in the spirit of the appended claims.

What is claimed is:

1. A vehicle having a single steerable front wheel comprising a front fender extending about the front wheel, a leg shield having a contoured front exterior surface angled upward from ahead of the front wheel and walls extending rearwardly from said front exterior surface adjacent said front wheel, a storage compartment formed within the leg shield and above said front wheel, said front exterior surface of said leg shield forming a lid comprising a lower lid and an upper lid hinged together at adjacent edges, front bumper means positioned forward of said front wheel at the lower edge of said lower lid, said bumper means forming a lower hinge connecting said lower lid to said front fender for simultaneous pivoting of said upper and lower lids to an open position wherein said adjacent edges abut together, and cooperating closure means attached between the upper edge of said upper lid and said leg shield to retain said lid closed.

2. The vehicle defined in claim 1 further including hinged biasing means permitting said lid to be opened and closed as a one-piece lid.

3. The vehicle defined in claim 2 wherein said leg shield and lid include cooperating locking means engageable to retain said lower lid closed while permitting opening and closing of said upper lid.

4. The vehicle defined in claim 3 wherein said cooperative locking means includes a locking means on one of said walls of said leg shield engageable with adjacent locking means on an inside of said lower lid.

5. The vehicle defined in claim 2 wherein said hinge biasing means includes a spring means maintaining said upper and lower lid in the shape of a one piece lid.

* * * * *